US006584449B1

(12) United States Patent  (10) Patent No.: US 6,584,449 B1
Otto  (45) Date of Patent: Jun. 24, 2003

(54) TIME-STAMPING OF MERCHANDISE PRIOR TO SALE

(75) Inventor: Jerome A. Otto, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/633,414

(22) Filed: Aug. 7, 2000

(51) Int. Cl.$^7$ .............................................. G60F 17/60
(52) U.S. Cl. ...................................................... 705/20
(58) Field of Search ........................................... 705/20

(56) References Cited

U.S. PATENT DOCUMENTS 5,745,036 A * 4/1998 Clare .......................... 340/572
5,874,896 A * 2/1999 Lowe et al. ................. 340/572

FOREIGN PATENT DOCUMENTS

GB  2 183 885  *  6/1987

OTHER PUBLICATIONS

"Rational shopping behavior and the option value of variable pricing" by Tech–Hua Ho, C. S. Tang and D. R. Bell, Management Science, vol. 44, No. 12, pt. 2, p. S145–S160.*

* cited by examiner

Primary Examiner—Kenneth R. Rice
(74) Attorney, Agent, or Firm—Gregory A. Welte; Paul W. Martin (57) ABSTRACT

A system for ascertaining prices of merchandise. Items of merchandise are labeled by Electronic Price Labels, EPLs. The prices stated by the EPLs can change, as when a sales promotion takes effect. If a customer selects an item prior to the change, but checks out after the change, the customer will ordinarily be charged the changed price, despite the fact that the customer saw another price on the EPL.

6 Claims, 9 Drawing Sheets

TIME-STAMPING OF MERCHANDISE PRIOR TO SALE

The invention records the time-of-day when an item of merchandise is selected by a shopper. The recordation prevents confusion to the shopper when Electronic Price Labels, EPLs, are used to indicate the price. The indicated price can change after the customer selects the item, but before purchase. In such a case, the customer would have seen one price, but be charged another.

BACKGROUND OF THE INVENTION

Figure 1:
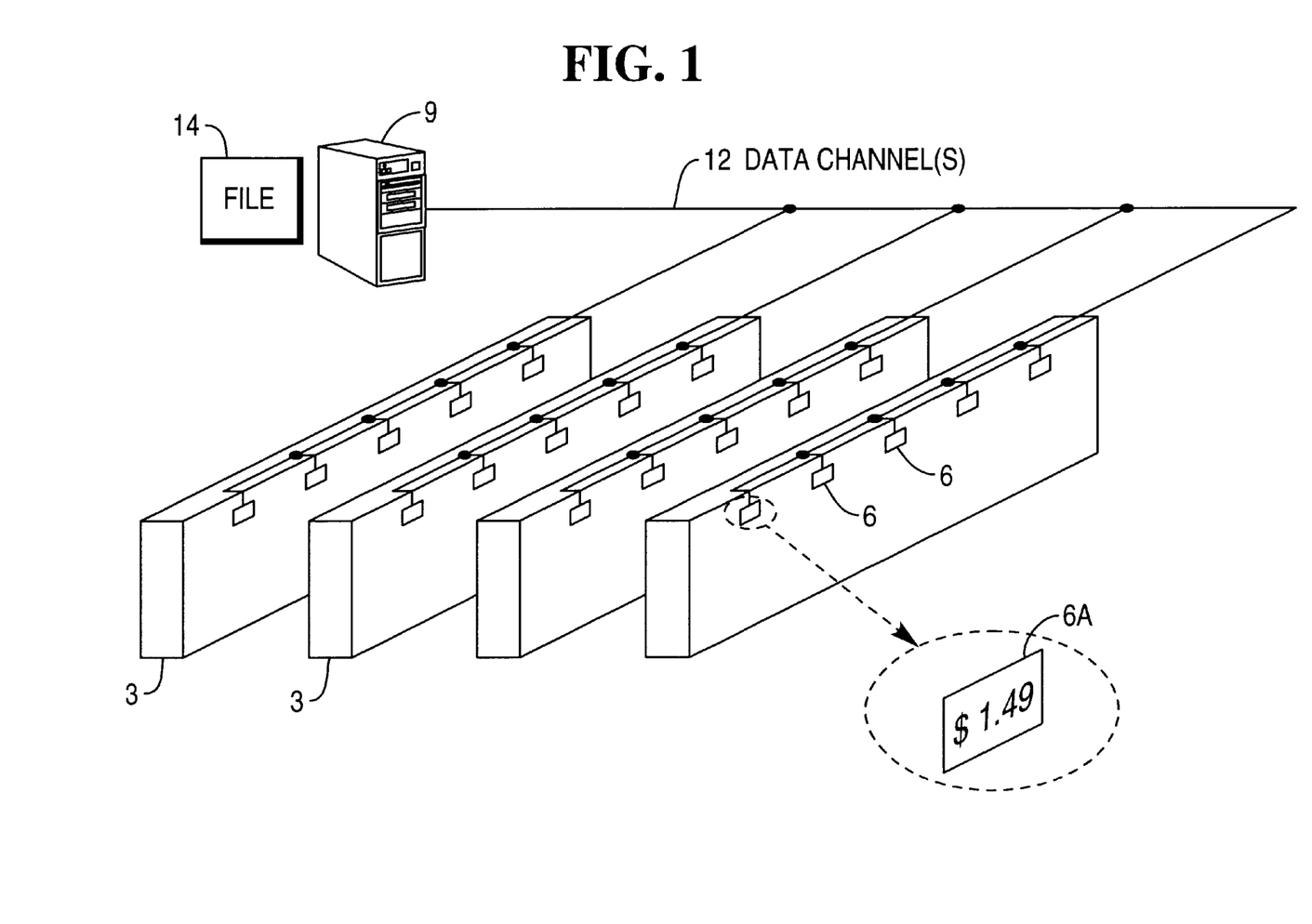
FIG. 1 illustrates a simplified view of shelves 3, containing Electronic Price Labels, EPLs, in a retail market.

Electronic Price Labels, EPLs, are coming into widespread usage in supermarkets and other retail outlets. FIG. 1 illustrates a simplified view of shelves 3 in a supermarket. The shelves 3 carry EPLs 6. A different EPL can be associated with each group of items contained on the shelves. For example, Brand X of tomato sauce would be associated with one EPL, and Brand Y with another EPL. However, the individual jars of Brand X tomato sauce are not associated with individual EPLs: a single EPL represents all Brand X jars.

The EPLs act as miniature electronic displays, and display the prices of the items with which they are associated. For example, the inset EPL 6A displays the price of "$1.49." EPLs can take the form of Liquid Crystal Displays, LCDs; displays using Light Emitting Diodes, LEDs; or can implement other technologies.

The EPLs 6 are controlled by server 9, through one, or more, data channels indicated by bus 12. Historically, in many early EPLs, bus 12 took the form of a hard-wired, physical bus. Today, hard-wired busses are being supplanted by wireless infrastructures, using rf and infra-red communication links. Both wireless and hard-wired systems can utilize the invention.

As an example of operation, the server 9 is given a data file 14, which contains (1) a list of all products carried by the shelves 3, (2) the bus-address of the EPL 6 associated with each product, and (3) a price to be displayed on each EPL 6.

To load a price into each EPL, the server 9, for each item on the list, places the bus-address of an EPL onto the bus 12. The EPLs contain decoding circuits, not shown but known in the art, which read that address. Only the EPL corresponding to the address placed on the bus 12 responds with an acknowledgement.

When the server 9 receives acknowledgement, it transmits the price onto the bus 12. When the EPL receives the price, it latches it, and issues a second, final, acknowledgement. The server 9 then proceeds through the remainder of EPLs on the list, in a similar manner.

Of course, other protocols can be undertaken in controlling and loading the EPLs.

A problem can arise in certain situations, when the supermarket wishes to change the prices displayed by the EPLs. Ordinarily, if the supermarket closes for business at night, it can change the EPLs at that time, and no problem arises. However, if the supermarket does not close, but remains open constantly, the following problem can occur.

Figure 2:
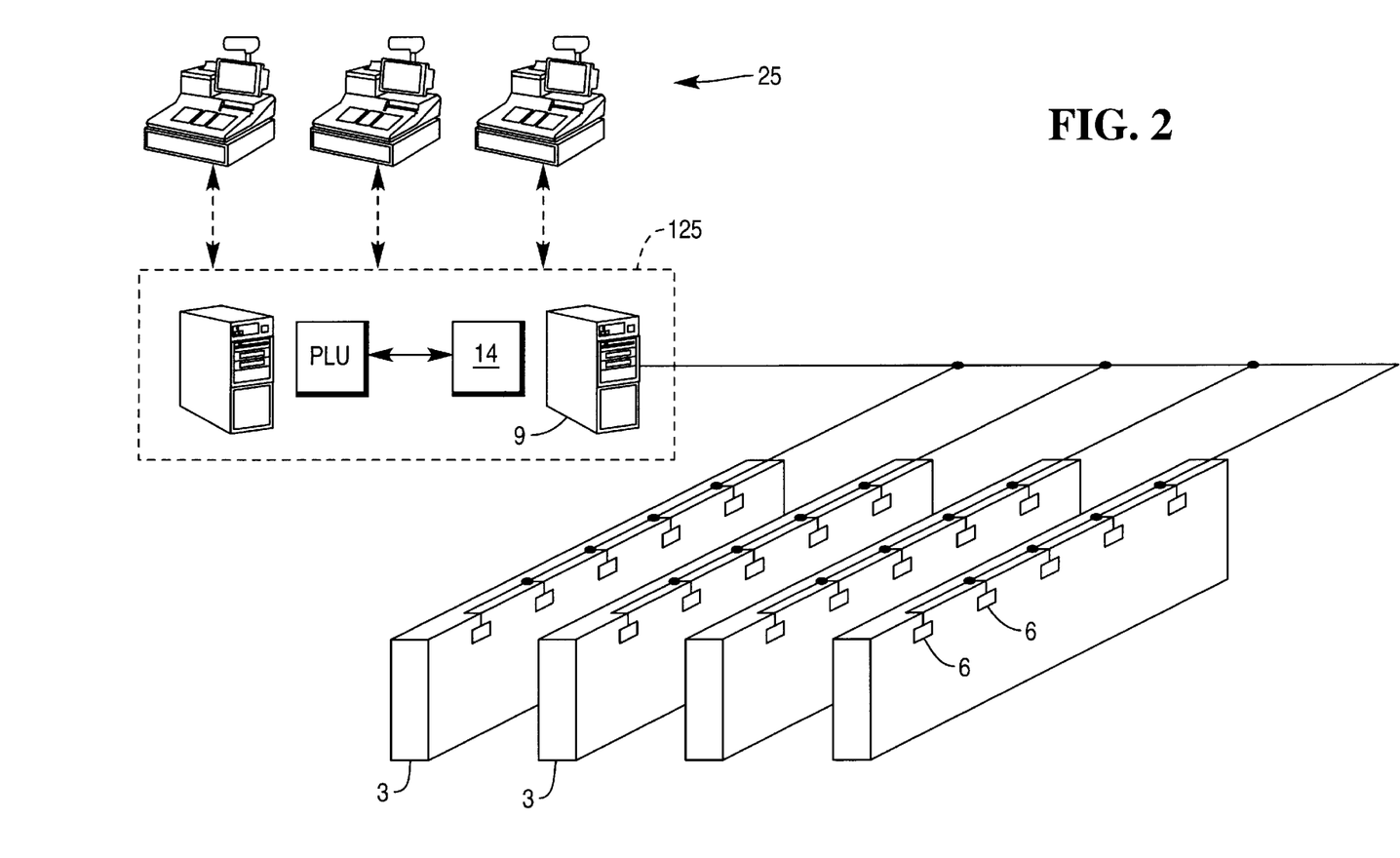
FIG. 2 adds a system of computers 125 to FIG. 1, together with check-out stations 25.

A customer can view a price displayed on one of the EPLs 6 in FIG. 2. The customer can select the corresponding item (not shown), and proceed to a check-out station 25. A scanner (not shown) at the check-out station 25 scans the item, and ascertains the price from a Price Look Up table PLU, which is maintained by a system of servers 125.

If the price displayed by the EPL had changed between (1) the time the customer selected the item and (2) the time of check-out, the PLU will contain the new, changed price. If the customer is charged the new price, the customer may become annoyed, because the price actually charged did not match the price displayed by the EPL.

One solution to this problem is to introduce a time delay, as suggested by U.S. Pat. No. 5,988,498 to Hoell, which is assigned to NCR Corporation, to which the present invention is also assigned. This Hoell patent is hereby incorporated by reference.

In Hoell, when a price change is to occur, the change is first made on an EPL 6. However, the change is not implemented immediately at the check-out stations 25. A delay is imposed. The delay is sufficiently long that any affected items will be purchased at the old price, as opposed to the new price.

However, this approach is not perfect. To be perfect, as a minimum, different delays must apply to different customers. For example, assume that a customer selects an item at 12:00, and the delay used is 1 hour. If the EPL changes at 12:15, the customer must check out by 1:15. Otherwise, the customer will be charged the new price. The delay has failed in this instance.

In addition, if a second customer selects the item in question at 12:45, and checks out at 12:50, that customer will be charged the old price, because the new price does not become effective until 1:15. Yet the new price was displayed.

SUMMARY OF THE INVENTION

In one form of the invention, whenever a customer selects an item of merchandise from its display point, the time-of-day when the selection occurred is recorded. In another form of the invention, when the customer presents the item at a Point of Sale terminal, POS, the POS uses (1) the time-of-day and (2) a table which states the price displayed at all relevant times, to ascertain the price displayed when the customer selected the item.

DETAILED DESCRIPTION OF THE INVENTION

Figure 3:
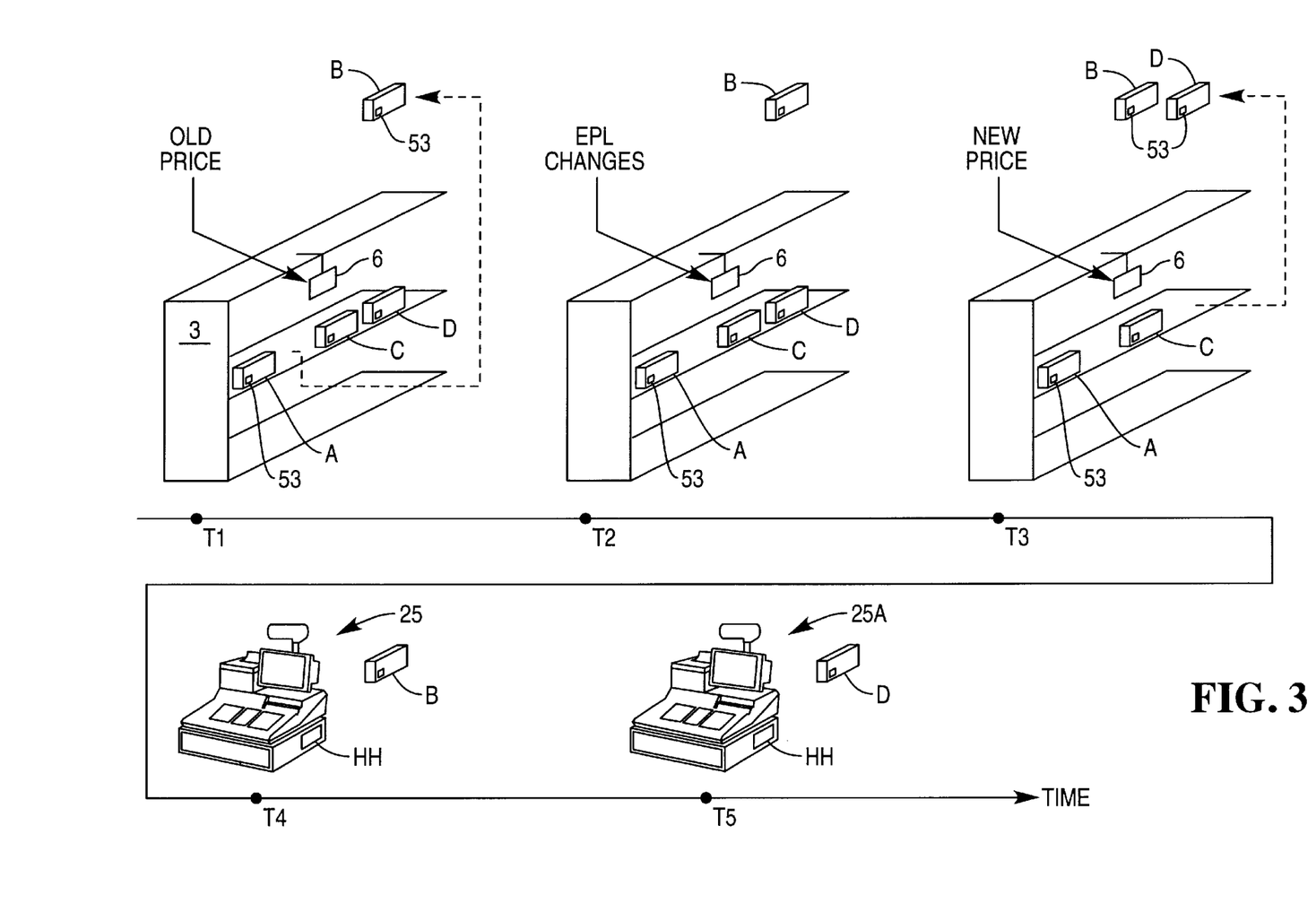
FIG. 3 illustrates a time-sequence of events occurring in one form of the invention.

FIG. 3 illustrates how one form of the invention operates in a specific situation, and shows five events, at five points in time. At time T1, an EPL 6 displays an old price for items A, B, C, and D which are all, for example, boxes of Brand X spaghetti. The customer selects item B, as indicated by its removal from shelf 3.

At time T2, the price displayed by the EPL 6 changes. Item B, of course, is not located on shelf 3 at this time, having been selected by a customer.

At time T3, another customer selects item D, as indicated by its removal from the shelf 3. Items B and D are shown removed from the shelf 3, to indicate they are now circulating in the market.

At time T4, item B is presented to a check-out station 25. The station 25 scans item B, and charges the customer the price displayed by the EPL at time T1. At time T5, item D is presented to a check-out station 25A. The station 25A scans item D, and charges the customer the price displayed by the EPL at time T3. Both items B and D are assessed the price displayed at the times of their respective selection by customers. How this is accomplished is explained below.

It is emphasized that the order in which items B and D are presented to the check-out stations 25 and 25A is not relevant. Also, the items B and D need not be presented to different check-out stations, but can be presented to the same station, and in any order.

Figure 4:
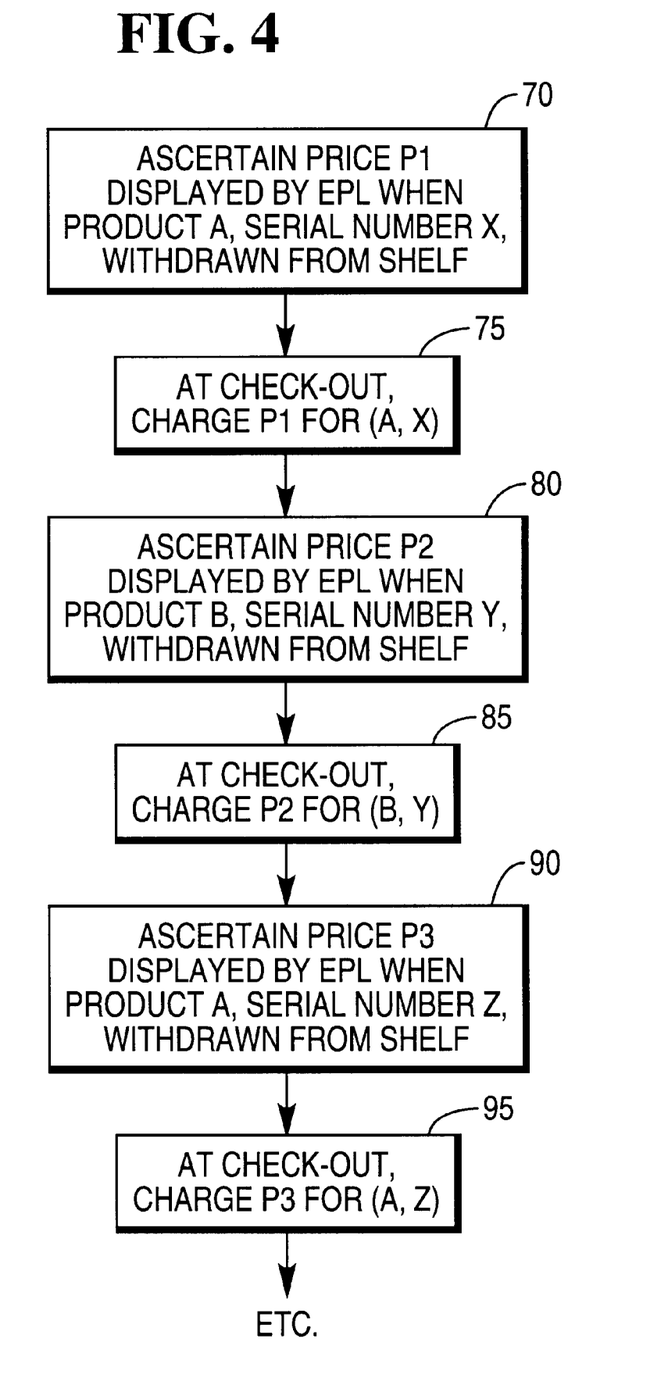
FIG. 4 is a flow chart illustrating procedures implemented by one form of the invention.

A flow chart illustrating one approach for attaining the accuracy in price assessment is shown in FIG. 4. As background, it is observed that every item carries a label, independent of the EPLs. The label bears a code indicating the item's identity, and may take the form of the well-known UPC, Uniform Product Code, although other such codes are available. The code may take the form of the so-called "bar code," but that is not necessary.

In addition, each individual item is assigned a serial number, which is also stated on a label carried by the item.

To illustrate by example: Brand A tuna, packaged in a 6-ounce can, will be assigned a specific identity code, such as a specific UPC. Every 6-ounce can of Brand A tuna will carry this code, which identifies the product as a 6-ounce can of Brand A tuna.

Each individual can will also carry a unique serial number, which distinguishes it from every other can. But all cans carry the same identity code, such as the same UPC. Thus, for example, one can will carry two codes. One code labels it as "Brand A, 6-ounce can." The other code labels it "serial number 1." Another can will also carry two codes. One code labels it as "Brand A, 6-ounce can." The other code labels it "serial number 2," and so on.

Similarly, Brand B tuna in a 6-ounce can will be assigned another UPC. One can will carry two codes. One code labels it as "Brand B, 6-ounce can." The other code labels it "serial number 1." Another can will also carry two codes. One code labels it as "Brand B, 6-ounce can." The other code labels it "serial number 2," and so on.

Two factors are here observed. One is that different products will carry different identity codes. For example, under the UPC system, different UPCs refer to different products. The second is that some, or all, serial numbers of Brand B may be identical to those of Brand A. That is, more generally, two different identity codes may "share" serial numbers. However, the overall UPC/serial-number combination of every item, including items bearing the same UPCs, will be unique.

The attachment of these two codes, identity and serial number, to the items is indicated generically by blocks 53 in FIG. 3. These codes can be carried in numerous different ways. Bar codes provide one example.

However, preferably, the codes are stored in electronic memory which is available to a transmitter, or transceiver, of the well known RFID type, or an equivalent, which is also attached to the product. Blocks 53 represent such a memory/transmitter, or memory/transceiver, combination.

RFID is an acronym for Radio Frequency Identification. RFID transmitters and transceivers are commercially available, as from RFID Inc, 3538 Peoria Street, Suite 505, Aurora, Colo. 80010. As an example, a device which can store 2K bits is available in a flat package about 0.54 inch square. This device can transmit data to, and receive data from, a commercially available transmitter located about 2–9 inches away. Other RFID devices are available which will have larger storage, and will communicate with transmitters 3 feet away, and farther.

Returning to FIG. 4, block 70 indicates that, when product A is presented to a check-out station, the price of product A which was displayed by the EPL at the time product A was selected is ascertained. That is, the price ascertained is that displayed by a specific EPL, at a specific previous point in time. The specific point in time is when (Product A, serial number X) was withdrawn from the display station associated with the EPL in question. That price may be the same as the price presently displayed by that EPL, but need not be.

Block 75 indicates that the price ascertained is charged for product A.

Similarly, block 80 indicates that the previous price displayed by an EPL for (Product B, serial number Y) is ascertained. Block 85 indicates that the price ascertained is charged for product A.

Block 90 indicates that, for product A, which was also involved in block 75, the price for a different serial number is ascertained. That is, blocks 75 and 90 involve the same product, but different serial numbers, such as two different boxes of Brand A spaghetti. Block 95 indicates that the price ascertained is charged for product B, serial number Z.

This process is repeated for all items purchased.

Figure 5:
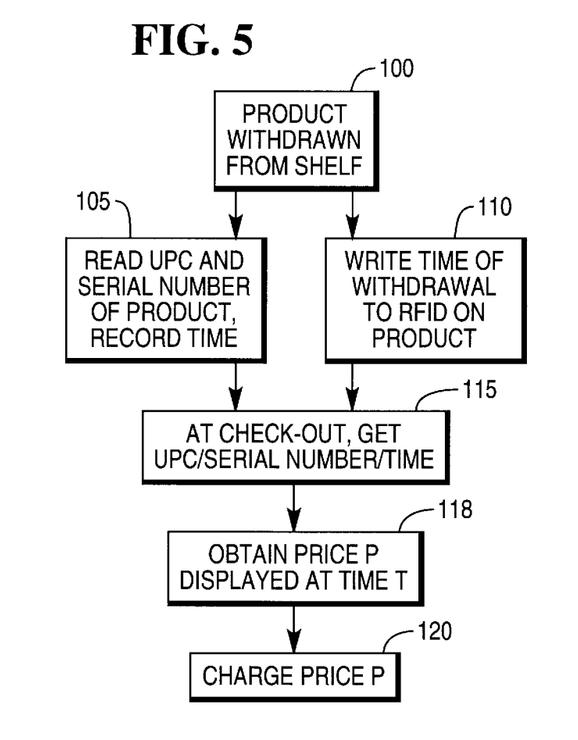
FIG. 5 is a flow chart illustrating procedures implemented by one form of the invention.

FIG. 5 illustrates an overview of several approaches which can be used to perform the ascertainment steps of blocks 70, 80, and 90 in FIG. 4. Block 100 in FIG. 5 indicates that a product is withdrawn from a shelf. Blocks 105 and 110 indicate two alternate approaches which can be undertaken, although situations can be envisioned wherein both approaches are undertaken in a given retail market.

Block 105 indicates that a reader, located near the EPL displaying the price of the item withdrawn in block 100, reads two pieces of data. One is the identity of the product, perhaps by reading the product's UPC. The other is the serial number of the product. This step can be accomplished if both pieces of data (the UPC and the serial number) are stored in an RFID device 53 in FIG. 3.

To repeat: when the product is withdrawn from its shelf, block 105 indicates that a reader reads (1) the identity code and (2) the serial number. Such readers are known in the art. The reader may be designed so that the customer must intentionally present the product to the reader's field of view for the reading to occur. Such readers are known. Alternately, the reader may be designed so that it is impossible to withdraw the product from its display point without passing through the reader's field of view. Such readers are also known.

Figure 6:
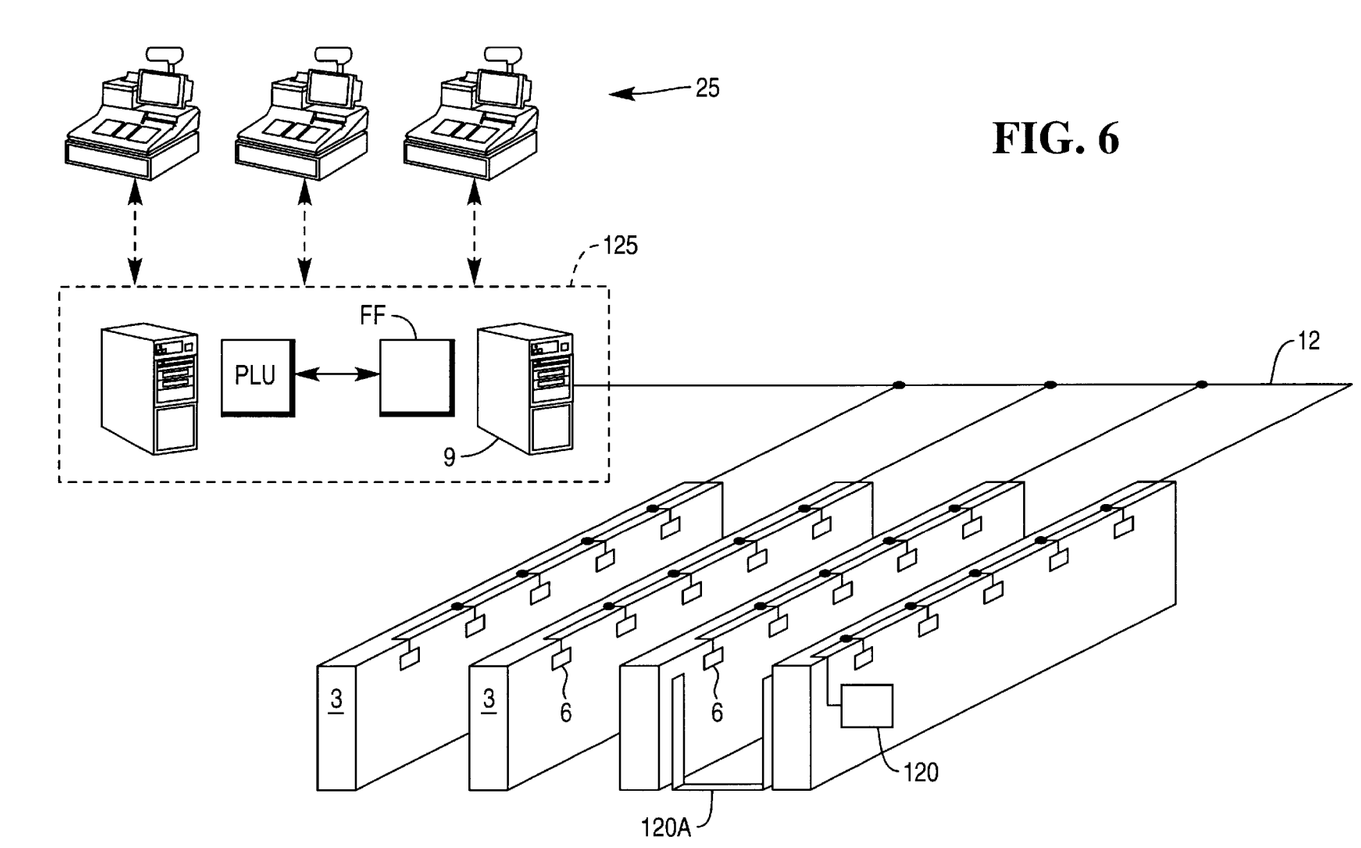
FIG. 6 illustrates one form of the invention, wherein one, or more, scanners 120 or 120A are installed in a retail market.

For example, readers, one of which is indicated by block 120 in FIG. 6, can be distributed throughout the market. When a customer selects an item, the customer passes the item through the field of view of the reader. In concept, the customer "scans" the item, to allow the reader to deduce the UPC/identity-code and serial number of the item.

Significantly, RFID devices are not strictly required in the approach of block 105 in FIG. 4, although they can be used. Printed bar codes, or other scannable visible symbols, can be used to specify both the UPC and the serial number.

In one embodiment, distinction-symbols are present within the UPC, serial number, or both, which identify the code as UPC or serial number. The distinction symbols prevent the scanning system from reading a serial number, and treating it as a UPC. Other approaches to distinguishing the identity code from serial numbers are possible. For example, each may be required to be written in a specific, different syntax, or different lengths, and so on.

In addition, block 105 in FIG. 5 records the time-of-day of the withdrawal. The information detected by block 105 (identity code, serial number, and time-of-day) is transmitted to a server, or system of servers 125 in FIG. 6 along bus 12, for use later.

It is pointed out that bus 12 is used to control the EPLs, and also to receive data scanned by the readers 120. This is not required: separate communication links can be used.

In the alternate approach, block 110 in FIG. 5 writes the time-of-day when the withdrawal occurred to the RFID device 53 in FIG. 3. That is, after withdrawal of the item from its display point, the RFID device, or equivalent, now bears a time-stamp. This time information is used later, as will be explained.

The steps of blocks 100, 105, and 110, as appropriate, are repeated for every item selected by the customer, or for specific items, if EPLs do not apply to all items. For example, fresh vegetables may not be labeled by RFID devices.

In block 115, the customer reaches a check-out station. For each item to be purchased, a point-of-sale terminal 25 in FIG. 6 obtains a set of data, as indicated in block 115 in FIG. 5. The particular set of data obtained may be different in different cases, depending on the approach taken to ascertain the price of the items.

The overall goal is to ascertain the price previously displayed by the EPL for each item, when each item was selected. In pursuit of this goal, the system obtains all, or part, of the triplet of (UPC/serial-number/time of selection). That is, depending on the approach taken, the entire triplet may not be necessary. For example, if the step of block 110 was utilized, the serial number is not necessary, because the time of withdrawal was written onto the item itself.

Block 118 indicates that the invention ascertains the price of the item. For example, the system of servers 125 in FIG. 6 can maintain a file FF containing some of the data illustrated in FIG. 7. The file FF contains, in column 121, the times when the EPL for each product changed. Alternately, and not shown, the file FF contains data indicating, for the last 24 hours, every price displayed by each EPL, and time periods each price was displayed. That is, the file FF contains a historical record of the prices displayed by each EPL, and the corresponding times for each price.

Figure 7:
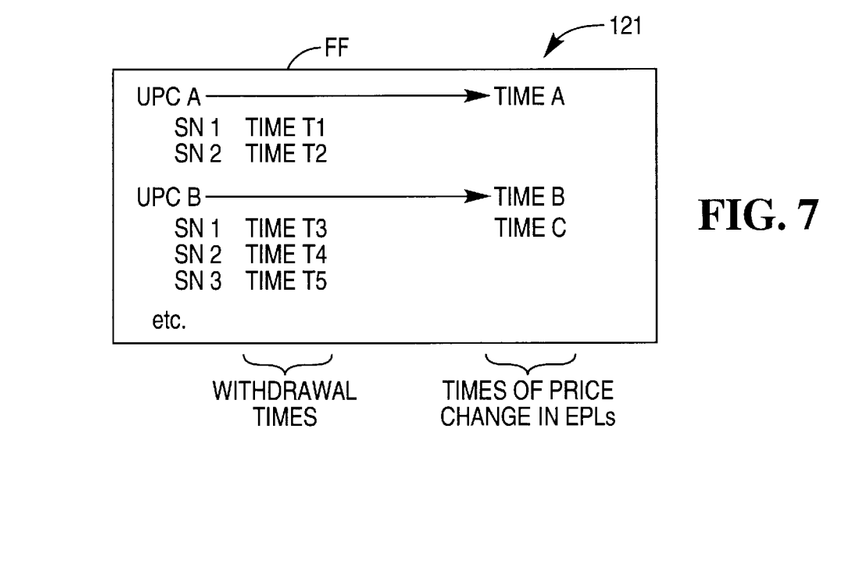
FIG. 7 illustrates a specific data structure contained in the server system 125 of FIG. 6.

The file FF is used as a look-up table, to ascertain the price displayed by the EPL for each product, based on the time of withdrawal ascertained in blocks 105 or 110.

In addition, depending on the approach taken, the file FF may also contain the times of withdrawals of each product, which were recorded in block 105 in FIG. 5. Several examples will illustrate some different approaches.

EXAMPLE 1

Assume that product A is labeled with (1) a UPC, or equivalent, and (2) a serial number. When the product A is selected by the customer, a scanner 120 in FIG. 6 reads the UPC and the serial number. The scanner 120 informs the server system 125 of those two items of data. The server system 125 records the time of day for that particular UPC/serial-number combination, indicated by entry "T1" in file FF in FIG. 7.

EXAMPLE 2

Assume the same facts as Example 1, but relatively few scanners 120 in FIG. 6 are used. Thus, the time-of-scanning of an item will be different from the time-of-removal of the item from a shelf. The system infers the time-of-removal, as by subtracting a delay from the current time-of-scanning. In one approach, the delay may be constant. In another approach, the delay may be based on the distance between the display point, or shelf position, of each item and the scanner's location.

For example, when the system is designed, a data triplet is stored in memory for each item, and each scanner. The triplets may be updated later. Each triplet indicates (1) a specific scanner, (2) an item, which has a display point where it is displayed, and (3) a delay time, which is the expected delay between the item's withdrawal from its display point and its presentation to the specific scanner.

That is, if ten scanners are used, and 1,000 items are on sale, then 10,000 triplets exist, one for each scanner-item pair. When a given scanner scans an item, the scanner locates the proper data-pair in memory, obtains an assumed delay, or computes one, and subtracts the delay from the then-current time-of-day, to thereby infer the time-of-removal of the item from its display point.

EXAMPLE 3

Same facts as in Example 1, but the UPC and the serial number are stored in a read-only RFID device 53 in FIG. 3. A local scanner 120 in FIG. 6 reads the RFID device, and informs the server system 125 of the time-of-withdrawal for the (UPC/serial-number pair). The server system stores that time-of-withdrawal in file FF in FIG. 7.

EXAMPLE 4

Same facts as in Example 1, but the UPC is stored on the item as a printed label, and the serial number is stored within a read-only RFID device, or vice-versa.

EXAMPLE 5

The product contains a read-write RFID transceiver 53 in FIG. 3. When the product is removed from its shelf, the product is passed within the field of view of a local scanner 120 in FIG. 6, which writes the time-of-day to the RFID transceiver 53. An adjusted time-of-day may be written, if desired, to infer the actual time-of-withdrawal, by subtracting a delay.

Block 118 in FIG. 5 computes the price displayed by the EPL when the item was withdrawn from its shelf, using all, or some, of the data obtained in block 115. Block 120 indicates that the price computed is charged to the customer. Blocks 115, 118, and 120 are repeated for each item.

Different Embodiments and Characterizations

FIG. 7 illustrates a file FF which can be stored within one, or more, servers in the system 125 in FIG. 6. File FF contains a time-of-withdrawal for each of several items. That file also contains the times when the prices of each EPL changed. That file allows a computation of the previous price displayed by the EPL for any item at the time when the item was withdrawn from its display point.

Figure 8:
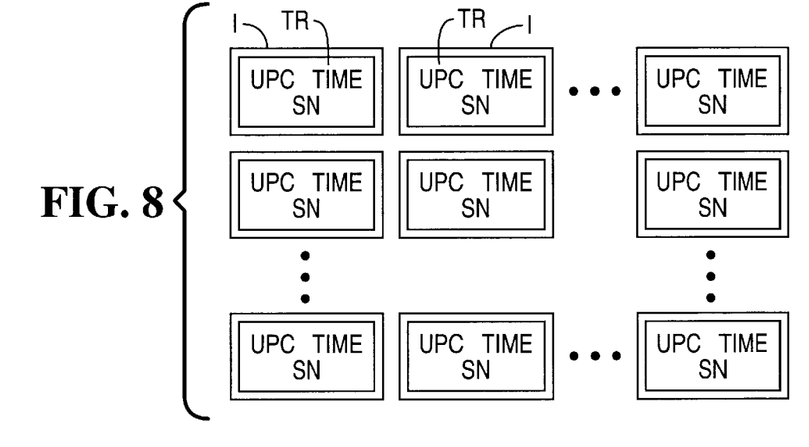
FIG. 8 illustrates a collection of items I which are found in a retail market in one form of the invention.

FIG. 8 illustrates several items I, which are carried by, or contained in shopping baskets of, customers within a retail market. In the general case, these items will be distributed, in groups, randomly throughout the retail market. Each item carries an RFID transceiver, or transmitter, TR. Stored within memory within the transceiver of each are one, or more, of the following data items: (1) the identity of the item, such as its UPC, (2) the serial number of the item, and (3) a time-of-day, which was written to the item after the time of its withdrawal from its display location.

Figure 9:
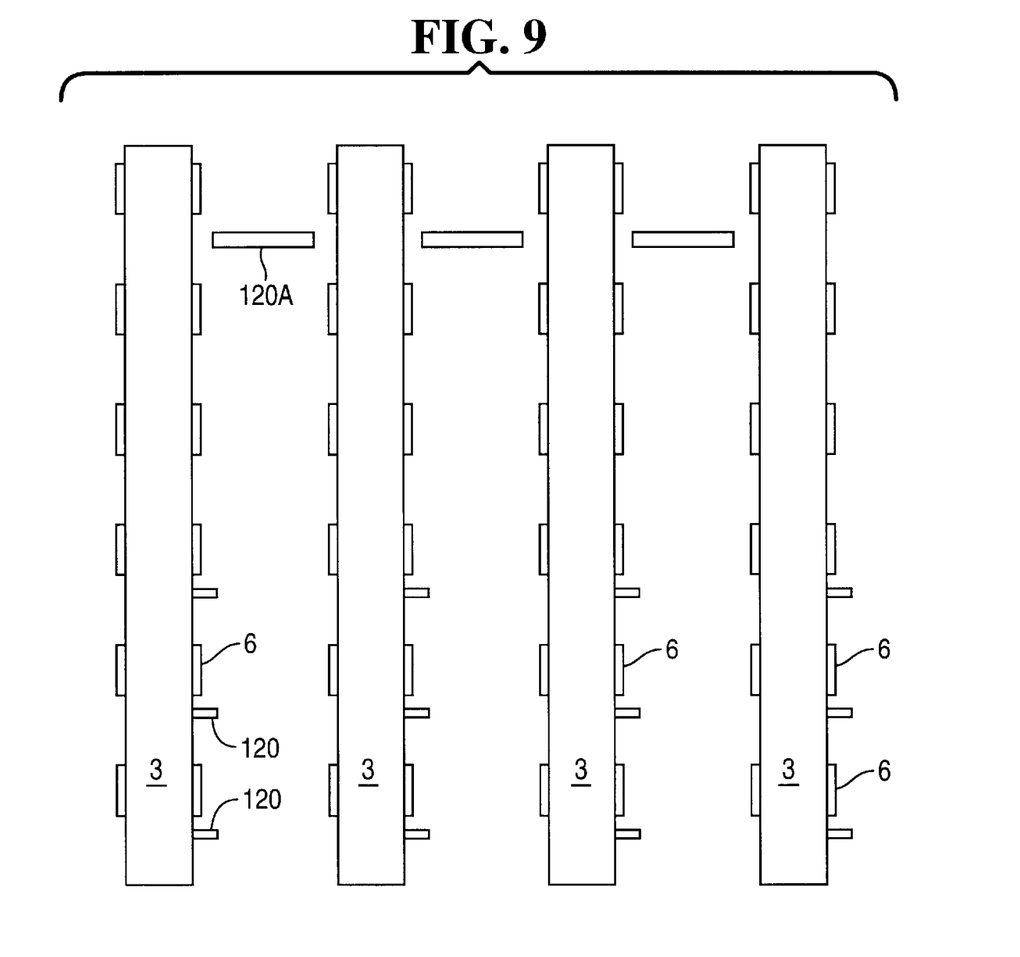
FIG. 9 is an overhead view of part of FIG. 6.

FIG. 9 illustrates one form of the invention. Shelves 3 of a retail market carry EPLs 6. In addition, the shelves 3 carry scanners 120, for reading and writing data to, and from, items as described herein. Each EPL 6 may be equipped with a scanner 120, or fewer scanners than EPLs may be provided.

Block 120A represents a specific type of scanner, such as that manufactured by Trolley Scan Ltd., PO box 59227, Kengray, Johannesburg, 2100, South Africa. This scanner 120A scans an entire shopping basket of items, and reads the RFID of each item. With this scanner 120A in place, a customer would first load several items into a cart, or the customer's arms. As the customer crossed the scanner 120A, the scanner would identify the items.

Under this approach, some items would be scanned more than once, because the cart will pass through multiple scanners 120A. However, only the first scan would be used for time-of-day purposes.

For example, if scanner 120A writes the time-of-day to the RFIDs, it first must ascertain whether a time-of-day has already been written. To this end, it attempts to read the time-of-day from each item. If none is found, scanner 120A writes the time-of-day. If a time-of-day is found, scanner 120 writes no time-of-day.

Alternately, scanner 120A can set a flag in the RFID device whenever a time-of-day is written. Before writing a time-of-day onto an item, it checks the flag first. If a set flag is found, nothing is written.

Figure 10:
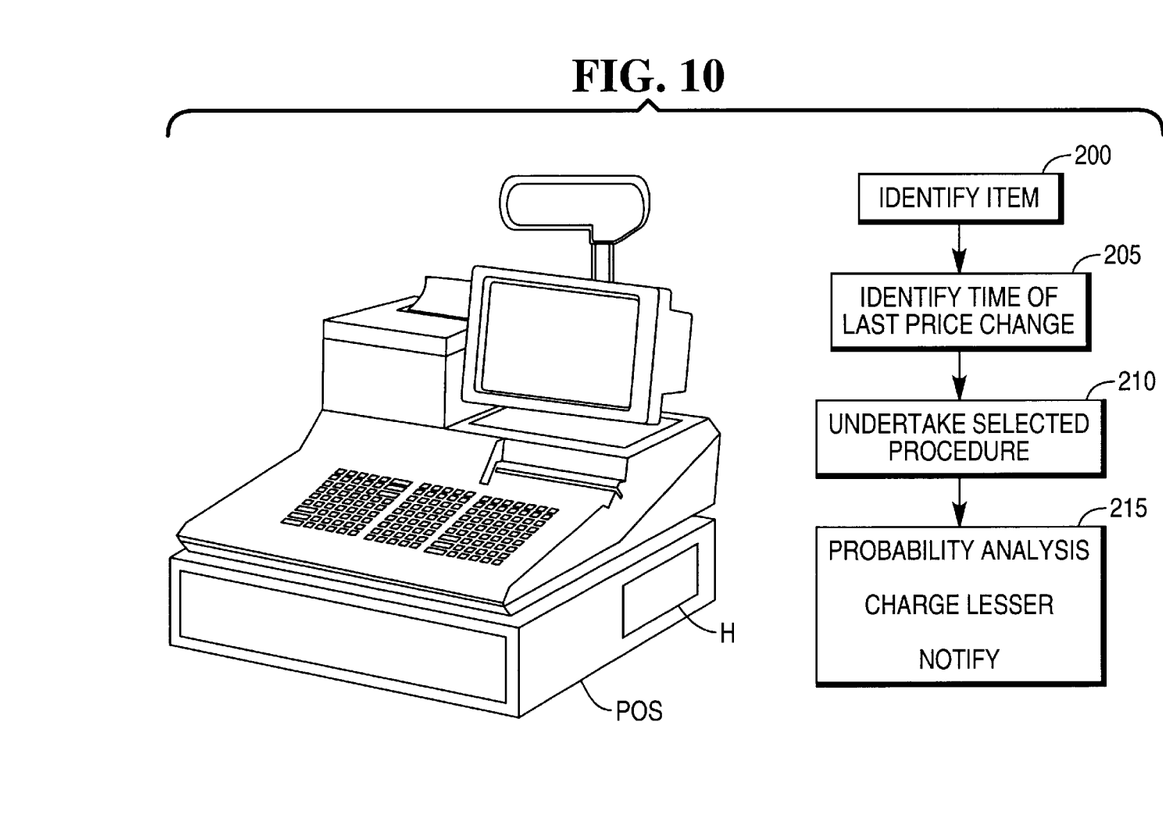
FIG. 10 is a flow chart illustrating procedures implemented by one form of the invention.

FIG. 10 illustrates another embodiment, in the form of a procedure undertaken by a point of sale terminal POS. Hardware and software indicated by block H, perhaps in collaboration with the server system 125 in FIG. 6, undertake the processes. In block 200, an item is identified, as by using processes described above. Block 205 identifies the time of the last price change for the item. However, no time-of-withdrawal of the item from its display point is computed, unlike the situations described above. Instead, block 210 indicates that one, or more, of the procedures in block 215 are undertaken.

Block 215 indicates that a probability analysis can be undertaken. This analysis estimates the likelihood that items scanned presently by the POS had been selected before the price change. For example, if the last price change for item X occurred 12 hours ago, it is almost certain that the specific item X presented to the POS was selected after the change. Times other than 12 hours can be used, and the particular time needed will depend on the local circumstances.

Block 215 contains the phrase "charge lesser." That phrase refers to a decision to charge the customer the least price displayed by the EPL within the last, say, two hours. This decision is undertaken to enhance customer relations.

Block 215 contains the phrase "notify." That phrase refers to a notification given to the customer, as by printing on a cash register receipt, or cash register display, a notice that the exact price displayed by the EPL when the item was selected was not known.

Figure 11:
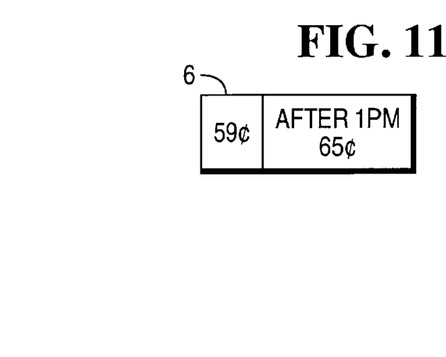
FIG. 11 illustrates an EPL displaying two prices, and a time when one price becomes effective.

FIG. 11 illustrates an EPL 6, which displays two prices. One price is the current price. The other price is that which will be charged by the POS in FIG. 10, if the item is presented to the POS after a specific time, which is also stated on the EPL. That is, the EPL contains (1) a current price, (2) a future price, and (3) a time when the future price becomes effective. The server system 125 in FIG. 3 controls the data displayed by the EPL.

In embodiments discussed above, a time-of-withdrawal of an item is used to infer the price displayed by an EPL at that time. In another embodiment, the price is written directly to an RFID device. For example, block 110 in FIG. 5 performs the additional step of ascertaining the price of the item when selected by the customer, and also writes that price onto the RFID device 53 in FIG. 3. Block 110 in FIG. 5 obtains the price from a buffer in the EPL, or from the server system 125.

In one implementation, a scanner 120 in FIG. 6 is associated with each EPL: one scanner for each EPL. Each scanner has access to a buffer in its EPL, the buffer holds the price. Alternately, each scanner is assigned the same bus-address as its EPL. When the prices are written to the EPLs, each scanner also receives a price, namely, that of its EPL.

That is, a scanner 120 in FIG. 6 (1) identifies the item after the customer selects it, (2) locates the price currently displayed by the EPL, and (3) writes that price onto the item into the RFID device. Alternately, the scanner can write the price onto a paper label, in bar-code form, which the customer then affixes to the item. At check-out, the POS need only read that price, and need not ascertain the UPC, serial number, or date.

Of course, if a label is used, the label could also contain the time-of-withdrawal, and that time can be used by the POS to ascertain the price displayed at that time.

In this embodiment, it may be preferable to add a security code to the RFID device, such as a Message Authentication Code, MAC, or a simple password. This assures that a genuine scanner 120, and not a scanner owned by the customer, wrote the price. MACs and passwords are described in the text *Applied Cryptography*, by Bruce Schneier (John Wiley & Sons, New York, 1996, ISBN 0 471 12845 7). This text is hereby incorporated by reference.

In one scenario, it may be assumed that (1) each item, after selection by a customer, will be scanned by a scanner 120 in FIG. 6, to ascertain time-of-day, (2) each item bears an RFID transceiver, or equivalent, having internal memory, and (3) that each item is identified by UPC and serial number. Under these assumptions, the price displayed by the EPL when the item was selected, can be ascertained at this time, and written to the RFID.

That is, the following steps are undertaken. The customer selects the item. A scanner 120 in FIG. 6 identifies the item, or a scanner 120A identifies a group of items. The server system 125, to which the scanners are connected, computes an estimated time of withdrawal, which may be taken as the time of the scan. The server system 125 locates the price of each item, as of that estimated time. The server system 125 transmits the price to the scanner 120 or 120A, which writes the price to the RFID.

Later, at the check-out stations 25, the price is read from the RFID.

Hardware, together with software, indicated by blocks HH in FIG. 3 perform processes described herein, perhaps in collaboration with the server system 125 in FIG. 6.

It is emphasized that, unlike the Hoell patent discussed above, the invention accurately ascertains the price displayed by the EPL. For example, if each item is required to pass through the field of view of a scanner when withdrawn from its display point, the exact time of withdrawal is ascertained. The displayed price at that exact time is therefore available.

Additional Embodiment

Figure 12:
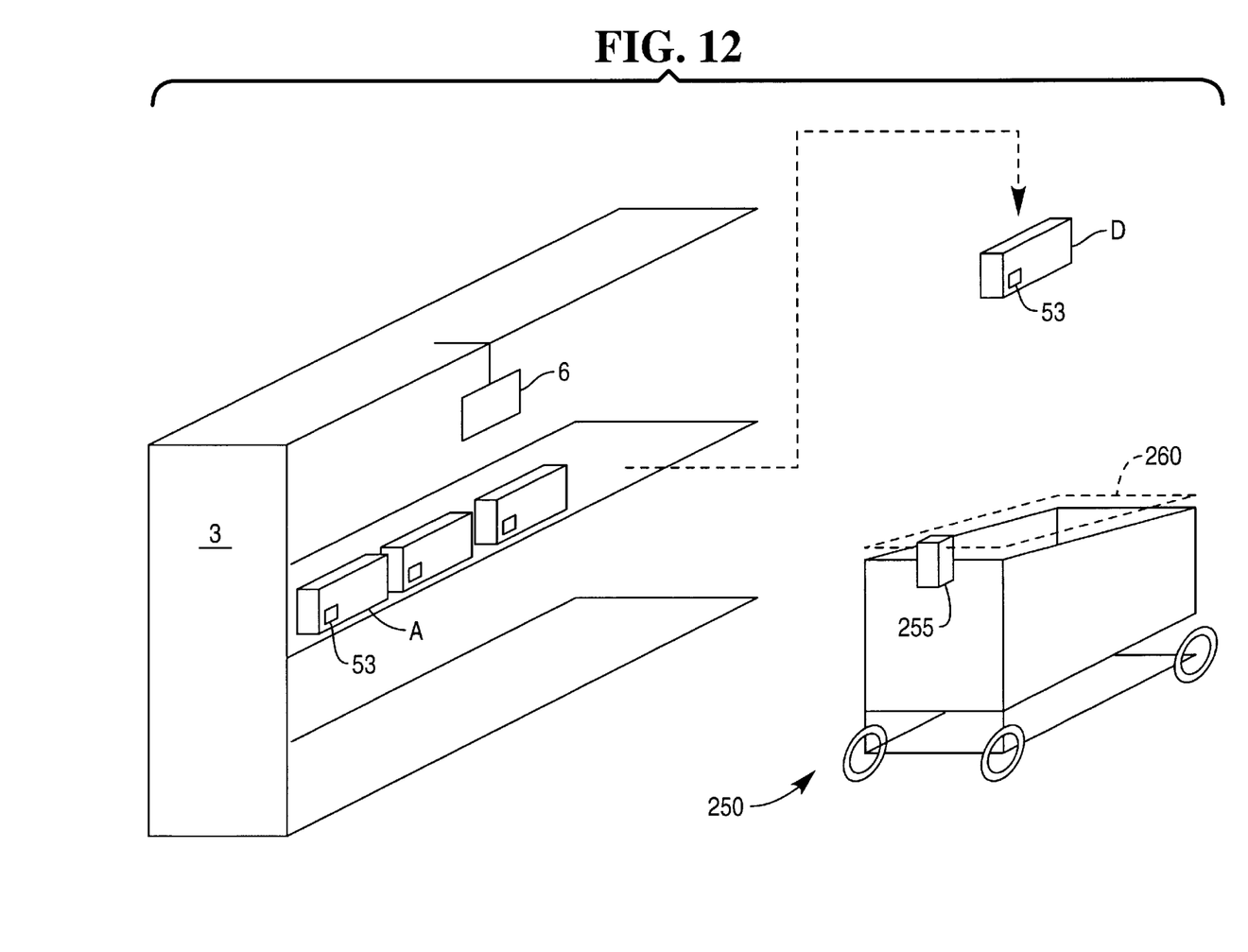
FIG. 12 illustrates one form of the invention.

FIG. 12 illustrates a shopping basket 250, which carries an RFID reader, or controller, 255, or equivalent. The RFID device 255 has a field-of-view 260.

A customer selects an item D, bearing an RFID label 53, and passes the item D through the field-of-view 260. The RFID reader 255 reads the product ID code 53, such as a UPC, and stores the code in memory. In addition, the RFID reader 255 looks up the present time-of-day, and stores the time-of-day in association with the product ID code. This is repeated for every item selected and deposited in the basket 250. Significantly, no serial number is read for the items, although a serial number can be useful, as explained below.

In this embodiment, memory within the RFID reader 255 contains numerous pairs of data, one pair for every product which crossed the field-of-view 260. Each pair can be represented as (product ID, time of selection).

When the customer has finished selecting items, the customer delivers the basket 250 to a check-out station 25 in FIG. 6. The check-out station interrogates the RFID reader 255, to ascertain the identity and time-of-selection of each item within the basket 250. Based on the time-of-selection, the check-out station 25 ascertains the price displayed at that time by the EPL 6 in FIG. 12 for each item.

As just explained, the RFID reader 255 in FIG. 12 stores all data needed to ascertain the price of each item in the basket 250. That data is transferred to the check-out station 25. Based on that data, the check-out station 25 looks up the price of each item, and calculates a total. The individual items are not scanned by a clerk.

In another approach, the RFID reader 255 writes the time-of-day to the RFID label 53 attached to the item D. This is repeated for every item deposited into the basket 255. Then, at check-out, each item is scanned by an RFID reader (not shown) located at a check-out station 25 in FIG. 6. The reader ascertains the product ID, and time-of-selection from the label 53.

In either approach just described, serial numbers may be desired. For example, if a customer placed two identical items into the basket 250, the RFID reader 255 will not necessarily distinguish them. However, if serial numbers are read, then logic within the reader 255 will list the serial numbers.

Specifically, a serial number and product ID are read from each product, as it is placed into basket 250. Logic within the reader 255 generates a list of all serial numbers for each product ID, together with a time-stamp for each.

Serial numbers would also be used if automated check-out is implemented, wherein the basket 250 is wheeled through an RFID reader such as reader 120A in FIG. 6, which identifies all items in the basket 250.

Numerous substitutions and modifications can be undertaken without departing from the true spirit and scope of the invention. What is desired to be secured by Letters Patent is the invention as defined in the following claims.

What is claimed is:

1. A system, comprising:
   a) racks which contain
      i) groups of items, and
      ii) for each group, a respective Electronic Price Label, EPL, which displays a price which changes over time;
   b) means for
      i) examining an item taken from a group, and
      ii) ascertaining the price displayed by the item's EPL, when the item was taken from its group.

2. System according to claim 1, wherein each item carries
   i) a code identifying the item, and
   ii) a code indicating a serial number.

3. A system, comprising:
   a) racks which contain groups of items;
   b) a respective price label for each group;
   c) means for changing at least some price labels; and
   e) means for ascertaining the previous price displayed by the price label of a group, when a specific item was withdrawn from the group.

4. A system, comprising:
   a) a plurality of items of merchandise, displayed on racks for selection by customers;
   b) Electronic Price Labels, EPLs, associated with the racks, each of which displays a price for an item;
   c) a server which changes the prices displayed by the EPLs;
   d) one or more check-out stations, each of which identifies an item presented; and
   e) means for ascertaining, for each item identified, the price displayed by the EPL when the item was removed from proximity of the EPL.

5. A system, comprising:
   a) a retail store containing items for sale;
   b) attached to some items, labels which indicate
      i) identity of the type of item,
      ii) a serial number, and
      iii) a time-of-day when the respective item was removed from a shelf.

6. A system, comprising:
   a) a retail store containing items for sale;
   b) Electronic Price Labels, EPLs, which
      i) display prices of the items to customers, and
      ii) display different prices, at different times, for a given item;
   c) a data file which contains a historical record of the prices displayed by the EPLs.

* * * * *